(12) United States Patent
Wei

(10) Patent No.: US 11,649,726 B1
(45) Date of Patent: May 16, 2023

(54) APPLICATION METHOD OF DEVICE FOR ACCURATELY EVALUATING VERTICAL CONTENT DISTRIBUTION OF UNDERSEA HYDRATE RESERVOIR

(71) Applicant: Guangzhou Marine Geological Survey, Guangzhou (CN)

(72) Inventor: Jiangong Wei, Guangzhou (CN)

(73) Assignee: Guangzhou Marine Geological Survey, Guangzhou (CN)

( * ) Notice: Subject to any disclaimer, the term of this patent is extended or adjusted under 35 U.S.C. 154(b) by 0 days.

(21) Appl. No.: 17/896,109

(22) Filed: Aug. 26, 2022

(30) Foreign Application Priority Data

Nov. 16, 2021 (CN) .......................... 202111353479.3

(51) Int. Cl.
| | |
|---|---|
| *E21B 49/08* | (2006.01) |
| *G01V 3/20* | (2006.01) |
| *E21B 47/07* | (2012.01) |
| *E21B 41/00* | (2006.01) |
| *E21B 49/00* | (2006.01) |
| *G01S 7/481* | (2006.01) |

(52) U.S. Cl.
CPC .......... *E21B 49/08* (2013.01); *E21B 41/0099* (2020.05); *E21B 47/07* (2020.05); *E21B 49/001* (2013.01); *G01S 7/4813* (2013.01); *G01V 3/20* (2013.01)

(58) Field of Classification Search
CPC ...... E21B 49/08; E21B 41/0099; E21B 47/07; E21B 49/001; G01S 7/4813; G01V 3/20
USPC .......................................................... 324/324
See application file for complete search history.

(56) References Cited

U.S. PATENT DOCUMENTS

2019/0368294 A1* 12/2019 Qin ........................ E21B 25/08

\* cited by examiner

*Primary Examiner* — Farhana A Hoque
(74) *Attorney, Agent, or Firm* — Bayramoglu Law Offices LLC

(57) ABSTRACT

An application method of a device for accurately evaluating the vertical content distribution of an undersea hydrate reservoir includes the following steps: assembling the device into a whole and screwing it into an undersea well; activating natural gas hydrates to produce gaseous substances; opening a directional guide channel corresponding to a thermal excitation system in a working state in S2, so that gaseous natural gas hydrates generated in this horizon enter a screw-in long sleeve through the directional guide channel; collecting, by a gas collection system, the gaseous natural gas hydrates; analyzing and recording components and contents in a box by an optical ranging unit and a resistivity unit; repeating S4 and S5 till the end of one collection cycle; and performing data processing and analysis. In this way, accurate evaluation of the vertical content distribution of undersea hydrates is realized.

6 Claims, 5 Drawing Sheets

APPLICATION METHOD OF DEVICE FOR ACCURATELY EVALUATING VERTICAL CONTENT DISTRIBUTION OF UNDERSEA HYDRATE RESERVOIR

CROSS REFERENCE TO THE RELATED APPLICATIONS

This application is based upon and claims priority to Chinese Patent Application No. 202111353479.3, filed on Nov. 16, 2021, the entire contents of which are incorporated herein by reference.

TECHNICAL FIELD

The present invention relates to content determination of undersea hydrates, in particular to an application method of a device for accurately evaluating the vertical content distribution of an undersea hydrate reservoir.

BACKGROUND

It is of great significance to know the location and distribution characteristics of natural gas hydrates, and it is also the foundation of all subsequent work. Detection techniques widely used in the world now mainly include acoustic detection technique, time domain reflection technique, impedance detection technique, and TDR and other test combined detection technique. At present, one of the most important and effective detection means is to detect the distribution of cold spring plumes in seawater to further determine the distribution area of hydrates and develop hydrates.

Theories and practice have proved that a sedimentary layer more than 300 m under the sea, i.e. a hydrate "stable region", meets the temperature and pressure conditions for hydrate formation, which is a favorable area for searching for natural gas hydrates. However, due to the influence of underground hydrotherm activity, tectonic movement, global warming and other factors, the temperature or pressure of the natural gas hydrate "stable region" will change, so the conditions for keeping the hydrates stable are no longer met, causing the hydrates to be decomposed into free gas and water. If there is a suitable migration channel, the free gas will migrate and leak into the seawater to form plumes. Seawater containing the free gas (cold spring) is different from surrounding seawater in physical characteristics. Cold springs, plumes and hydrates are closely related. Undersea plumes usually develop in the water overlying active cold springs. Plumes are the direct manifestation of seabed gas leakage. A seabed stratum underlying a cold spring area is often rich in natural gas hydrates. Hydrates can coexist with plume methane bubbles in seawater, or be an independent hydrate sheet, or cover the methane bubbles. A gas source of plumes may be methane gas formed by decomposition of hydrates in the stratum and free gas which is not formed into hydrates.

At present, the main approach to detect the distribution and content of undersea natural gas hydrate reservoirs mainly depends on the monitoring of cold spring plumes by geophysics. Firstly, a distribution range of hydrates is determined, and then large-scale evaluation is conducted by marine geophysical methods. After the evaluation is completed, due to the shortcomings of geophysical detection methods, including inaccuracy, dependence on experience, inability to conduct detailed survey of hydrate reservoirs, etc., it is necessary to carry out logging, drilling and sampling on a certain site according to the judgment of experts to define the distribution of hydrate reservoirs in this area.

However, after logging, drilling and sampling, the inevitable disturbance to soil during drilling, the interaction between seawater and soil after drilling, and the reduction of overburden pressure protection will directly lead to great changes in excess pore water pressure, temperature, salinity, PH, etc., and the temperature field and pressure field of reservoirs have a great influence on the mode of occurrence and distribution of natural gas hydrates, and will directly lead to the secondary distribution of natural gas hydrates, thus affecting the accurate evaluation of the vertical content distribution of undersea hydrates. To sum up, the prior art cannot accurately evaluate the secondary distribution of natural gas hydrates caused by drilling.

SUMMARY

The purpose of the present invention is to overcome the above defects in the prior art, and to provide an application method of a device for accurately evaluating the vertical content distribution of an undersea hydrate reservoir, which realizes accurate evaluation of the vertical content distribution of undersea hydrates.

The technical scheme of the present invention is as follows. An application method of a device for accurately evaluating the vertical content distribution of an undersea hydrate reservoir includes the following steps:

S1, assembling the device into a whole and screwing it into an undersea well:

where, the active excitation type device for accurately evaluating the vertical content distribution of an undersea hydrate reservoir includes a gas collection system and a screw-in long sleeve, the gas collection system is fixed above the screw-in long sleeve, the screw-in long sleeve is tubular, a plurality of groups of thermal excitation systems are fixed to a side wall of the screw-in long sleeve in an axial direction at intervals, and each group of thermal excitation systems includes a plurality of thermal exciters which are located in a same horizontal direction and evenly spaced in a circumferential direction of the long sleeve;

the side wall of the screw-in long sleeve is also provided with temperature sensors and a plurality of groups of directional guide channels arranged at intervals in the axial direction of the long sleeve, one temperature sensor and one group of directional guide channels are arranged above each group of thermal excitation mechanisms, and each group of directional guide channels includes a plurality of directional guide channels which are located in the same horizontal direction and evenly spaced in a peripheral direction of the long sleeve;

the gas collection system includes an upper fixed shell, a rotating shaft, and a plurality of circular rotating boxes fixed on the rotating shaft, the upper fixed shell is fixedly connected to a top of the screw-in long sleeve, the rotating shaft is rotationally connected to the upper fixed shell, a collection chamber is arranged in the circular rotating box, and one side of the circular rotating box is provided with an opening; the plurality of circular rotating boxes are evenly spaced on an annular outer side of the rotating shaft, the circular rotating boxes are fixedly connected through corresponding side edges on bottoms, and the rotating shaft is located at joints of the plurality of circular rotating boxes; when the circular rotating box rotates to a lowest level, the opening of the circular rotating box is located just above a top opening of the screw-in long sleeve, and the circular rotating box is in an inverted state;

an optical ranging unit and a resistivity unit are arranged in each circular rotating box; and the whole device is screwed into the well, and an outer side wall of the screw-in long sleeve is attached to the well;

S2, activating natural gas hydrates to produce gaseous substances:

where, the thermal excitation systems are screwed out of the screw-in long sleeve and inserted into outside soil, under the condition that different excitation parts have a same temperature, the thermal excitation systems of different horizons in the axial direction are started in turn, the temperature of soil is monitored in real time by the temperature sensors and the thermal excitation systems are controlled to generate a specified temperature, and during the continuous heating of the thermal excitation systems, part of the solid and liquid natural gas hydrates in the soil of the horizon are continuously converted into gaseous natural gas hydrates;

S3, opening a directional guide channel corresponding to a thermal excitation system in a working state in S2, so that the gaseous natural gas hydrates generated in this horizon enter the screw-in long sleeve through the directional guide channel;

S4, collecting, by the gas collection system, the gaseous natural gas hydrates:

where, when the gaseous natural gas hydrates rise to a top of the screw-in long sleeve, the gaseous natural gas hydrates directly flow into the circular rotating box with the opening facing the screw-in long sleeve, and part of the gaseous natural gas hydrates condense into granular solids which adhere to an inner surface of the box; with the continuous accumulation of the gaseous natural gas hydrates, the circular rotating box is under constantly increasing buoyancy; when the buoyancy is greater than the gravity of the box, the circular rotating box will automatically turn over around the rotating shaft under the action of the buoyancy, and at this point, the box which has already full will be converted into a standby station, and other circular rotating boxes at standby stations will rotate to a collection station for continuous collection;

S5, analyzing and recording components and contents in a box by an optical ranging unit and a resistivity unit:

where, through the optical ranging unit, solid-liquid-gas components are determined according to reflectivity difference; through the resistivity unit, contents of solid, gaseous and liquid substances are determined according to conductivity difference of the substances; and after the data obtained by the optical ranging unit and the resistivity unit is recorded, solid particles and gaseous substances in the circular rotating box are released;

S6, repeating S4 and S5 till the end of one collection cycle:

specifically, after repeating S4 and S5 several times, the thermal excitation system and directional guide channel of this horizon are turned off, and the temperature change during this process is continuously observed; when the temperature drops to an initial temperature and stays the same for a specified period of time, one collection cycle is finished, the directional guide channel is closed, and the gas collection system automatically turns over, emptying residual natural gas hydrates in the circular rotating box; and S7, performing data processing and analysis:

where, the data obtained in S5 is statistically processed to obtain comprehensive data collected within this cycle, and the gas-liquid-solid three-phase data is inverted to obtain the amount of the gaseous natural gas hydrates generated by the thermal excitation of the natural gas hydrates of different horizons at a certain temperature; and the thermal excitation systems located in other horizons are turned on, the directional guide channels located in these horizons are opened, and S1 to S7 are repeated to determine the occurrence and content of natural gas hydrates in any reservoir.

According to the present invention, in S2, the temperature of soil is monitored in real time by the temperature sensors and the thermal excitation systems are controlled to generate a specified temperature.

In S3, gaseous natural gas hydrates generated by the thermal excitation system of a certain horizon enter the screw-in long sleeve through the directional guide channel under the diffusion effect of the gaseous natural gas hydrates, and the gas entering the sleeve can no longer overflow through the channel due to the high pressure of gaseous natural gas hydrates outside the device; besides, because the density of gas is much lower than that of air and seawater and the gas temperature is high, the gaseous natural gas hydrates keep rising in the screw-in long sleeve all the way up to the gas collection system.

The thermal exciter is cylindrical, with external threads arranged on an outer circumferential surface, and the thermal exciter is screwed in or out through the external threads; the thermal excitation system in an initial state is located in the screw-in long sleeve, and an outer side of the thermal excitation system is flush with an outer wall of the screw-in long sleeve; and in the working process, the thermal exciter is screwed out of the screw-in long sleeve and inserted into outside soil.

The optical ranging unit includes a laser emitting module and a distance measuring module, the laser emitting module includes a laser emitter which is located on a bottom surface of the circular rotating box, the laser emitter emits light which will be reflected when meeting a seawater interface, and no obvious reflection mechanism occurs when the light meets gas crystals; and then, a rising height of seawater in the box at a certain moment is obtained by the distance measuring module, and the proportion of seawater is calculated according to the rising height.

The resistivity unit is located in the circular rotating box, the resistivity unit includes two resistivity probing rods fixedly connected to a bottom of the circular rotating box, and the resistivity probing rod includes a plurality of spiral electrode modules; the spiral electrode module includes a cylindrical module body and a movable spiral electrode surrounding an annular outer side of the module body, an installation groove and a connecting hole are formed in the module body, a wire connected to the spiral electrode is arranged in the installation groove, a fixing rod is arranged in the connecting hole, the spiral body is fixedly connected to the fixing rod, and the spiral electrode modules are arranged in an axial direction of the probing rod;

a pitch of the spiral electrode is the same as a height of the module body, that is, each spiral electrode makes a full circle around the annular outer side of the module body, a top end of the spiral electrode is fixedly connected to the module body, an annular side wall of the module body is provided with a sliding groove in the axial direction, an electrode transmission fixture is slidably arranged in the sliding groove, and the electrode transmission fixtures in the sliding grooves are all fixedly connected to a transmission cable, and driven by the transmission cable to slide up and down in the sliding grooves; and electrode transmission fixtures are also arranged at the one-half pitch of the spiral electrode and at a bottom end of the spiral electrode, and are fixedly connected to the spiral electrode, the deformation of the spiral electrode is controlled by the sliding of two electrode transmission fixtures at the middle and bottom of the spiral electrode to form a closed annular electrode, and at this point, the resistivity probing rods enter a measurement mode.

The present invention has the following advantages:

(1) the rotating shaft and the plurality of circular rotating boxes fixedly connected to the rotating shaft are arranged, and the circular rotating boxes automatically turn over in the collection process, thus realizing the continuous collection of natural gas hydrate plumes in one collection cycle, and greatly improving the accuracy of collection results; and (2) through the resistivity unit and the optical ranging unit, the proportions of gaseous, liquid and solid crystalline particles are determined, and through data inversion, the content distribution and occurrence mode of natural gas hydrates in different excitation areas are calculated, thus realizing the accurate evaluation of the vertical content distribution of undersea hydrates.

Figure 1:
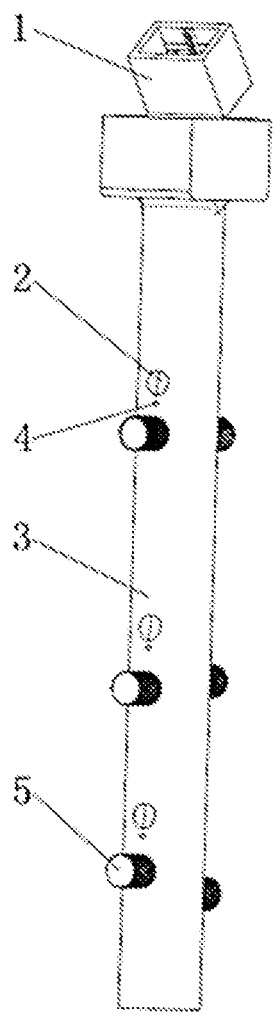
FIG. 1 is an overall structural diagram of the present invention.

In the drawings: 1 gas collection system; 2 directional guide channel; 3 screw-in long sleeve; 4 temperature sensor; 5 thermal excitation system; 6 upper fixed shell; 7 circular rotating box; 8 rotating shaft; 10 optical ranging unit; 11 resistivity unit; 12 resistivity probing rod; 13 spiral electrode module; 1301 module body; 1302 spiral electrode; 1303 sliding groove; 1304 electrode transmission fixture; 1305 transmission cable; 1306 annular electrode.

DETAILED DESCRIPTION OF THE EMBODIMENTS

In order to make the above objects, features and advantages of the present invention better understood, the specific embodiments of the present invention will be described in detail below with reference to the accompanying drawings.

In the following description, specific details are set forth in order to fully understand the present invention. However, the present invention can be implemented in many other ways different from those described here, and those skilled in the art can make similar extension without violating the connotation of the present invention. Therefore, the present invention is not limited by the specific embodiments disclosed below.

An application method of a device for accurately evaluating the vertical content distribution of an undersea hydrate reservoir provided by the present invention includes the following steps.

Step 1, assembling the device into a whole and screwing it into an undersea well.

Figure 2:
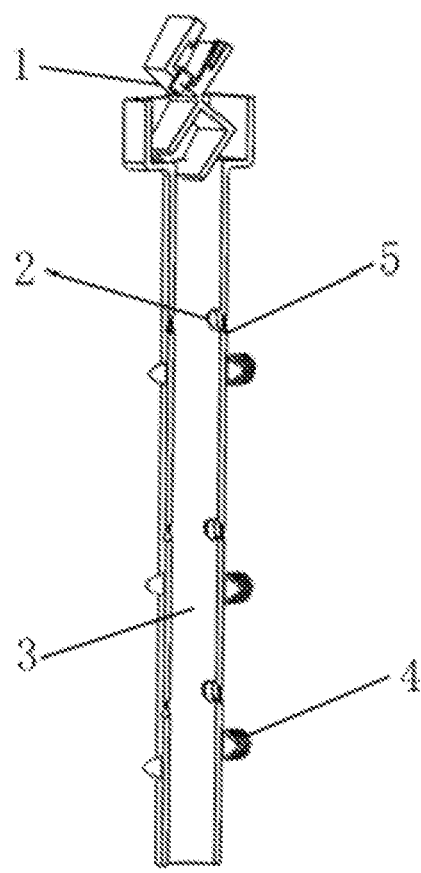
FIG. 2 is a cross-sectional structural diagram of the present invention.
Figure 3:
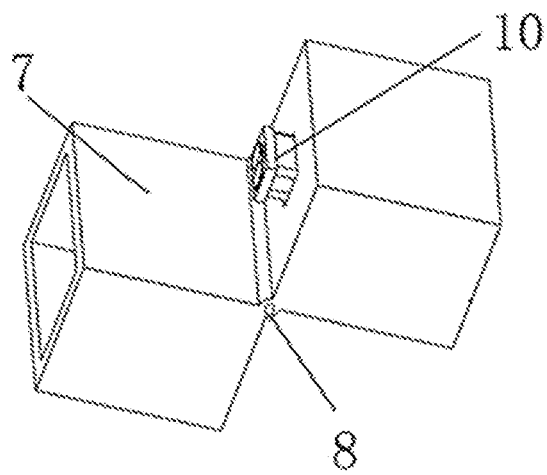
FIG. 3 is a first structural diagram of a gas collection device.
Figure 4:
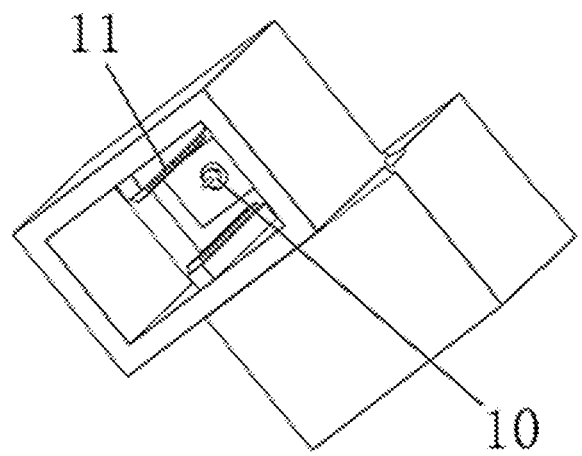
FIG. 4 is a second structural diagram of a gas collection device.
Figure 5:
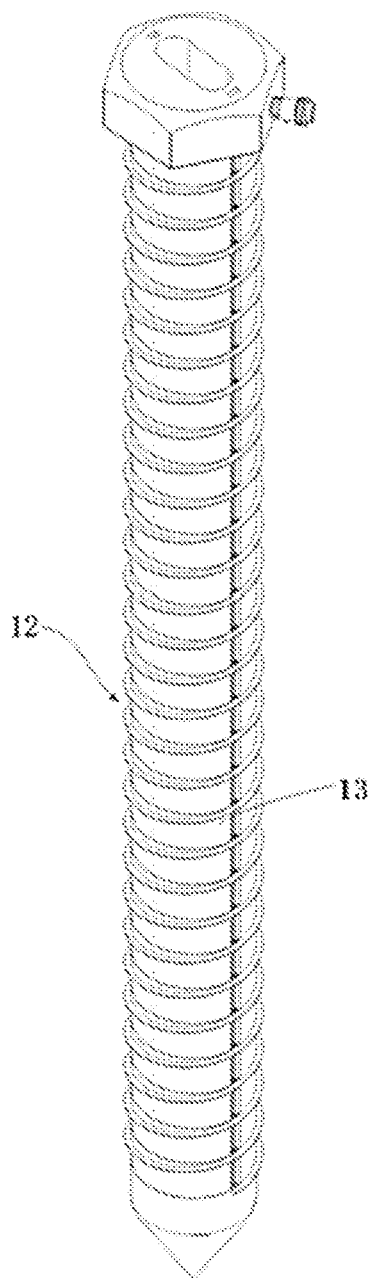
FIG. 5 is a structural diagram of a resistivity probing rod.
Figure 6:
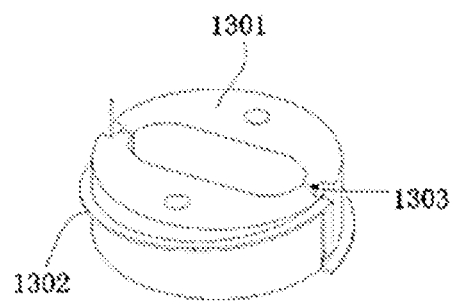
FIG. 6 is a structural diagram of a spiral electrode module in an idle state.
Figure 7:
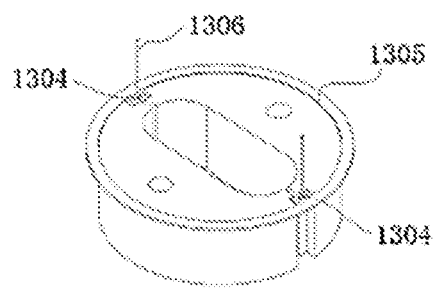
FIG. 7 is a structural diagram of a spiral electrode module in a working state.

As shown in FIGS. 1-2, the active excitation type device for accurately evaluating the vertical content distribution of an undersea hydrate reservoir provided by the present invention includes a gas collection system 1 and a screw-in long sleeve 3, the gas collection system 1 is fixed above the screw-in long sleeve 3, the screw-in long sleeve 3 is tubular, a plurality of groups of thermal excitation systems 5 are fixed to a side wall of the screw-in long sleeve 3 in an axial direction at intervals, and each group of thermal excitation systems 5 includes a plurality of thermal exciters which are located in the same horizontal direction and evenly spaced in a circumferential direction of the long sleeve; the thermal exciter is cylindrical, with external threads arranged on an outer circumferential surface, and the thermal exciter is screwed in or out through the external threads; the thermal excitation system 5 in an initial state is located in the screw-in long sleeve 3, and an outer side of the thermal excitation system 5 is flush with an outer wall of the screw-in long sleeve 3; and in the working process, the thermal exciter is screwed out of the screw-in long sleeve 3 and inserted into outside soil; in the heating process of the thermal exciter, by controlling the temperature change of the thermal exciter, surrounding soil reaches a certain temperature, and then hydrates are heated to change from a solid state to gas and liquid states; in addition, the side wall of the screw-in long sleeve 3 is also provided with temperature sensors 4, which can sense the temperature of the surrounding soil in real time, so as to control the heating temperature of the surrounding soil by the heating mechanism 5.

The side wall of the screw-in long sleeve 3 is also provided with a plurality of groups of directional guide channels 2 arranged at intervals in the axial direction of the screw-in long sleeve 3, one group of directional guide channels 2 is arranged above each group of thermal excitation mechanisms 5, and each group of directional guide channels 2 includes a plurality of directional guide channels 2 which are located in the same horizontal direction and evenly spaced in a peripheral direction of the long sleeve. The directional guide channel 2 can be controlled to be opened or closed. When a certain group of thermal excitation mechanisms 5 works, the directional guide channels 2 corresponding to this group of thermal excitation mechanisms 5 are opened, and the directional guide channels 2 of other groups are closed. Gaseous hydrates produced by the thermal excitation system 5 are squeezed into the screw-in long sleeve 3 through the directional guide channel 2 under great pressure, but gas in the screw-in long sleeve 3 cannot overflow through this channel. Because the gas density is low and the temperature is high, gaseous products will rise continuously in a cavity of the screw-in long sleeve 3 all the way up to the gas collection system 1.

The gas collection system 1 is located at an intersection of a seabed surface and a water body, and includes an upper fixed shell 6, a rotating shaft 8, and a plurality of circular rotating boxes 7 fixed on the rotating shaft 8, the upper fixed shell 6 is fixedly connected to a top of the screw-in long sleeve 3, the rotating shaft 8 is rotationally connected to the upper fixed shell 6, a collection chamber is arranged in the circular rotating box 7, one side of the circular rotating box 7 is provided with an opening, and natural gas hydrate plumes enter the circular rotating box 7 through the opening; the plurality of circular rotating boxes 7 are evenly spaced on an annular outer side of the rotating shaft 8, the circular rotating boxes 7 are fixedly connected through corresponding side edges on bottoms, and the openings of the circular rotating boxes 7 face different directions; when a certain circular rotating box 7 rotates to the lowest level, the opening of the circular rotating box 7 is located just above a top opening of the screw-in long sleeve 3, and the circular rotating box 7 is in an inverted state, which effectively makes gaseous products condense into solids or liquid in the process of entering the box for collection.

The rotating shaft 8 is located at joints of the plurality of circular rotating boxes 7, and the rotating shaft 8 can drive the circular rotating boxes 7 to rotate in the rotating process. During the rotation of the rotating shaft 8, it can be ensured that one of the circular rotating boxes 7 is always above the screw-in long sleeve 3, so as to achieve the purpose of non-intermittent collection.

In the special case where the volume of gaseous natural gas hydrates activated in a certain horizon is larger than the gas containing volume of the circular rotating box 7, gas rising into the box generates upward buoyancy on the circular rotating box 7, and when the gas in the box increases continuously, the buoyancy increases correspondingly. By calculating the buoyancy generated when the gas in the box is full, the weight of the circular rotating box 7 can be correspondingly set, so as to ensure that the circular rotating box 7 can automatically turn over after being full of gas, because the buoyancy is greater than the gravity.

An optical ranging unit 10 and a resistivity unit 11 are arranged in each circular rotating box 7. The optical ranging unit 10 includes a laser emitting module and a distance measuring module, the laser emitting module includes a laser emitter which is located on a bottom surface of the circular rotating box 7, the laser emitter emits light which will be reflected when meeting a seawater interface, and no obvious reflection mechanism occurs when the light meets gas crystals; and then, a rising height of seawater in the box at a certain moment is obtained by the distance measuring module, and the proportion of seawater is calculated according to the rising height.

The resistivity unit 11 is located in the circular rotating box 7, the resistivity unit includes two resistivity probing rods 12 fixedly connected to a bottom of the circular rotating box 7, and the resistivity probing rod 12 includes a plurality of spiral electrode modules 13; the spiral electrode module 13 includes a cylindrical module body 1301 and a movable spiral electrode 1302 surrounding an annular outer side of the module body 1301, an installation groove and a connecting hole are formed in the module body 1301, a wire connected to the spiral electrode 1302 is arranged in the installation groove, a fixing rod is arranged in the connecting hole, the spiral body is fixedly connected to the fixing rod, and the spiral electrode modules 13 are arranged in an axial direction of the probing rod to form a probing rod body; a pitch of the spiral electrode 1302 is the same as a height of the module body 1301, that is, each spiral electrode 1302 makes a full circle around the annular outer side of the module body 1301, a top end of the spiral electrode 1302 is fixedly connected to the module body 1301, an annular side wall of the module body 1301 is provided with a sliding groove 1303 in the axial direction, an electrode transmission fixture 1304 is slidably arranged in the sliding groove 1303, and the electrode transmission fixtures 1304 in the sliding grooves 1303 are all fixedly connected to a transmission cable 1305, and driven by the transmission cable 1305 to slide up and down in the sliding grooves 1303; and electrode transmission fixtures 1304 are also arranged at the one-half pitch of the spiral electrode 1302 and at a bottom end of the spiral electrode 1302, and are fixedly connected to the spiral electrode 1302, the deformation of the spiral electrode 1302 is controlled by the sliding of two electrode transmission fixtures 1304 at the middle and bottom of the spiral electrode 1302 to form a closed annular electrode 1306, and at this point, the resistivity probing rods 12 enter a measurement mode.

Because the resistivity of solid particles and the resistivity of gaseous particles are quite different, and the resistivity and the conductivity are negative reciprocals of each other, the resistivity probing rod 12 can adopt the Schlumberger electrode method to measure the resistivity, and then the ratio of solid particles to liquid particles can be obtained by inversion. Based on the occurrence mode difference between natural gas hydrates and collected substances detected by the resistivity probing rod 12, together with the results measured by the optical ranging unit 10, the proportions of gas-phase substances, liquid-phase substances and solid-phase substances at a certain moment can be obtained, and then the distribution and occurrence characteristics of hydrates in the activated reservoir can be analyzed.

The present invention also includes a control system which is electrically connected to the rotating shaft 8, the optical ranging unit 10, the resistivity unit 11, the temperature sensor 4, the thermal excitation system 5 and the directional guide channel 2. The control system can control the rotation of the rotating shaft 8, on and off of the optical ranging unit 10 and the resistivity unit 11, reception of temperature information of the temperature sensor 4, heating temperature of the thermal excitation system 5, screw in and out of the thermal excitation system 5, and open and close the directional guide channel 2.

After the assembly of the device, the whole device is screwed into the well with the help of an existing well part, and at this point, the outer side wall of the screw-in long sleeve 3 is attached to the well.

Step 2, activating natural gas hydrates to produce gaseous substances.

The thermal excitation systems 5 are screwed out of the screw-in long sleeve 3 and inserted into outside soil. To control a single variable, under the condition that different excitation parts have the same temperature, the thermal excitation systems 5 of different horizons in the axial direction are started in turn, the temperature of soil is monitored in real time by the temperature sensors 4, temperature values are transmitted to the control system, the thermal excitation systems 5 are controlled by the control system to generate a specified temperature so that a corresponding part can reach an expected temperature value, and during the continuous heating of the thermal excitation systems 5, part of the solid and liquid natural gas hydrates in the soil near the device are continuously converted into gaseous natural gas hydrates.

Step 3, opening a directional guide channel 2 corresponding to a thermal excitation system 5 in a working state in Step 2, so that the gaseous natural gas hydrates generated in this horizon enter the screw-in long sleeve 3.

Gaseous natural gas hydrates generated by the thermal excitation system 5 of a certain horizon enter the screw-in long sleeve 3 through the directional guide channel 2 under the diffusion effect of the gaseous natural gas hydrates, and the gas entering the sleeve can no longer overflow through the channel due to the high pressure of gaseous natural gas hydrates outside the device; besides, because the density of gas is much lower than that of air and seawater and the gas temperature is high, the gaseous natural gas hydrates keep rising in the sleeve all the way up to the gas collection system 1 on the top.

Step 4, collecting, by the gas collection system 1, the gaseous natural gas hydrates.

When the gaseous natural gas hydrates rise to a top of the screw-in long sleeve 3, the gaseous natural gas hydrates directly flow into the circular rotating box 7 with the opening facing the screw-in long sleeve 3, and due to the nature of natural gas hydrates, in the circular rotating box 7, part of the gaseous natural gas hydrates condense into granular solids which adhere to an inner surface of the box; with the continuous accumulation of the gaseous natural gas hydrates, the circular rotating box 7 is under constantly increasing buoyancy; when the buoyancy is greater than the gravity of the box, the circular rotating box 7 will automatically turn over around the rotating shaft 8 under the action of the buoyancy, and at this point, the box which is already full will be converted into a standby station, and other circular rotating boxes 7 at standby stations will rotate to a collection station for continuous collection.

Step 5, analyzing and recording the components and content in a box by an optical ranging unit 10 and a resistivity unit 11.

Through the optical ranging unit 10 in the box, solid-liquid-gas components are determined according to reflectivity difference. Through the resistivity unit 11 in the box, according to conductivity difference of the substances, solid particles (natural gas hydrates), gaseous natural gas hydrates, and seawater can be accurately distinguished and their proportions can be determined. After the data obtained by the optical ranging unit 10 and the resistivity unit 11 is recorded, solid particles and gaseous substances in the circular rotating box 7 are released.

Step 6, repeating Step 4 and Step 5 till the end of one collection cycle.

One collection cycle is from the moment when the thermal excitation system 5 starts to function to the moment when the gas collection system 1 finishes collection and measurement. After Step 4 and Step 5 are repeated several times, the thermal excitation system 5 of this horizon is turned off, and the temperature change during this process is continuously observed; and when the temperature drops to an initial temperature and stays the same for a specified period of time, one collection cycle is finished. After each collection cycle is finished, the directional guide channel 2 is closed, and the gas collection system 1 automatically turns over, emptying residual natural gas hydrates in the circular rotating box 7 and preparing for the accurate collection of natural gas hydrates in the next cycle.

Step 7, performing data processing and analysis.

The data obtained in Step 5 is statistically processed to obtain comprehensive data collected within this cycle, and the gas-liquid-solid three-phase data is inverted to obtain the amount of the gaseous natural gas hydrates generated by the thermal excitation of the natural gas hydrates of different horizons at a certain temperature.

Through the control system, the thermal excitation systems 5 located in other horizons are turned on, the directional guide channels 2 located in these horizons are opened, and Step 1 to Step 7 are repeated to determine the occurrence and content of natural gas hydrates in any reservoir.

An application method of a device for accurately evaluating the vertical content distribution of an undersea hydrate reservoir provided by the present invention has been introduced in detail. In this specification, specific examples are used to explain the principle and implementation of the present invention, and the description of the above embodiments is only used to help understand the method of the present invention and its core ideas. It should be pointed out that for those of ordinary skill in the art, multiple improvements and modifications may be made to the present invention without departing from the principle of the present invention, and these improvements and modifications also fall within the scope of protection of the claims of the present invention. The above description of the disclosed embodiments enables those skilled in the art to implement or use the present invention. Various modifications to these embodiments will be apparent to those skilled in the art, and the general principles defined herein may be implemented in other embodiments without departing from the spirit or scope of the present invention. Therefore, the present invention is not to be limited to the embodiments shown herein, but is to accord with the widest scope consistent with the principles and novel features disclosed herein.

What is claimed is:

1. An application method of a device for accurately evaluating a vertical content distribution of an undersea hydrate reservoir, comprising:

S1, assembling the device into a whole and screwing it into an undersea well:

wherein, the active excitation type device for accurately evaluating the vertical content distribution of the undersea hydrate reservoir comprises a gas collection system and a screw-in long sleeve, the gas collection system is fixed above the screw-in long sleeve, the screw-in long sleeve is tubular, a plurality of groups of thermal excitation systems are fixed to a side wall of the screw-in long sleeve in an axial direction at intervals, and each group of thermal excitation systems comprises a plurality of thermal exciters which are located in a same horizontal direction and evenly spaced in a circumferential direction of the long sleeve;

the side wall of the screw-in long sleeve is also provided with temperature sensors and a plurality of groups of directional guide channels arranged at intervals in the axial direction of the long sleeve, one temperature sensor and one group of directional guide channels are arranged above each group of thermal excitation mechanisms, and each group of directional guide channels comprises a plurality of directional guide channels which are located in the same horizontal direction and evenly spaced in a peripheral direction of the long sleeve;

the gas collection system comprises an upper fixed shell, a rotating shaft, and a plurality of circular rotating boxes fixed on the rotating shaft, the upper fixed shell is fixedly connected to a top of the screw-in long sleeve, the rotating shaft is rotationally connected to the upper fixed shell, a collection chamber is arranged in the circular rotating box, and one side of the circular rotating box is provided with an opening; the plurality of circular rotating boxes are evenly spaced on an annular outer side of the rotating shaft, the circular rotating boxes are fixedly connected through corresponding side edges on bottoms, and the rotating shaft is located at joints of the plurality of circular rotating boxes; when the circular rotating box rotates to a lowest level, the opening of the circular rotating box is located just above a top opening of the screw-in long sleeve, and the circular rotating box is in an inverted state;

an optical ranging unit and a resistivity unit are arranged in each circular rotating box; and the whole device is screwed into the well, and an outer side wall of the screw-in long sleeve is attached to the well;

S2, activating natural gas hydrates to produce gaseous substances:

wherein, the thermal excitation systems are screwed out of the screw-in long sleeve and inserted into outside soil, under a condition that different excitation parts have a same temperature, the thermal excitation systems of different horizons in the axial direction are started in turn, and during a continuous heating of the thermal excitation systems, a part of the solid and liquid natural gas hydrates in a soil of the different horizons are continuously converted into gaseous natural gas hydrates;

S3, opening a directional guide channel corresponding to a thermal excitation system in a working state in S2, so that the gaseous natural gas hydrates generated in the different horizons enter the screw-in long sleeve through the directional guide channel;

S4, collecting, by the gas collection system, the gaseous natural gas hydrates:

wherein, when the gaseous natural gas hydrates rise to the top of the screw-in long sleeve, the gaseous natural gas hydrates directly flow into the circular rotating box with the opening facing the screw-in long sleeve, and a part of the gaseous natural gas hydrates condense into granular solids which adhere to an inner surface of the box; with a continuous accumulation of the gaseous natural gas hydrates, the circular rotating box is under a constantly increasing buoyancy; when the buoyancy is greater than a gravity of the box, the circular rotating box will automatically turn over around the rotating shaft under an action of the buoyancy, and at this point, the box which has been already full will be converted into a standby station, and other circular rotating boxes at standby stations will rotate to a collection station for a continuous collection;

S5, analyzing and recording components and contents in the box by the optical ranging unit and the resistivity unit:

wherein, through the optical ranging unit, solid-liquid-gas components are determined according to a reflectivity difference; through the resistivity unit, contents of solid, gaseous, and liquid substances are determined according to a conductivity difference of the substances; and after data obtained by the optical ranging unit and the resistivity unit is recorded, solid particles and the gaseous substances in the circular rotating box are released;

S6, repeating S4 and S5 till an end of one collection cycle:

wherein, after repeating S4 and S5 several times, the thermal excitation system of this horizon is turned off, and a temperature change during this process is continuously observed; when a temperature drops to an initial temperature and stays the same for a specified period of time, the one collection cycle is finished, the directional guide channel is closed, and the gas collection system automatically turns over, emptying residual natural gas hydrates in the circular rotating box; and S7, performing a data processing and analysis:

wherein, the data obtained in S5 is statistically processed to obtain comprehensive data collected within this cycle, and the gas-liquid-solid three-phase data is inverted to obtain an amount of the gaseous natural gas hydrates generated by a thermal excitation of the natural gas hydrates of the different horizons at a certain temperature; and the thermal excitation systems located in other horizons are turned on, the directional guide channels located in these horizons are opened, and S1 to S7 are repeated to determine an occurrence and content of natural gas hydrates in any reservoir.

2. The application method of the device for accurately evaluating the vertical content distribution of the undersea hydrate reservoir according to claim 1, wherein in S2, a temperature of soil is monitored in real time by the temperature sensors and the thermal excitation systems are controlled to generate a specified temperature.

3. The application method of the device for accurately evaluating the vertical content distribution of the undersea hydrate reservoir according to claim 1, wherein in S3, gaseous natural gas hydrates generated by the thermal excitation system of a certain horizon enter the screw-in long sleeve through the directional guide channel under a diffusion effect of the gaseous natural gas hydrates, and the gas entering the sleeve can no longer overflow through the directional guide channel due to a high pressure of the gaseous natural gas hydrates outside the device; besides, because the density of the gas is much lower than that of air and seawater and a gas temperature is high, the gaseous natural gas hydrates keep rising in the screw-in long sleeve all the way up to the gas collection system.

4. The application method of the device for accurately evaluating the vertical content distribution of the undersea hydrate reservoir according to claim 1, wherein the thermal exciter is cylindrical, with external threads arranged on an outer circumferential surface, and the thermal exciter is screwed in or out through the external threads; the thermal excitation system in an initial state is located in the screw-in long sleeve, and an outer side of the thermal excitation system is flush with an outer wall of the screw-in long sleeve; and in a working process, the thermal exciter is screwed out of the screw-in long sleeve and inserted into the outside soil.

5. The application method of the device for accurately evaluating the vertical content distribution of the undersea hydrate reservoir according to claim 1, wherein the optical ranging unit comprises a laser emitting module and a distance measuring module, the laser emitting module comprises a laser emitter which is located on a bottom surface of the circular rotating box, the laser emitter emits a light which will be reflected when meeting a seawater interface, and no obvious reflection mechanism occurs when the light meets gas crystals; and then, a rising height of seawater in the box at a certain moment is obtained by the distance measuring module, and a proportion of the seawater is calculated according to the rising height.

6. The application method of the device for accurately evaluating the vertical content distribution of the undersea hydrate reservoir according to claim 1, wherein the resistivity unit is located in the circular rotating box, the resistivity unit comprises two resistivity probing rods fixedly connected to a bottom of the circular rotating box, and each of the resistivity probing rods comprises a plurality of spiral electrode modules; the spiral electrode module comprises a cylindrical module body and a movable spiral electrode surrounding an annular outer side of the module body, an installation groove and a connecting hole are formed in the module body, a wire connected to the spiral electrode is arranged in the installation groove, a fixing rod is arranged in the connecting hole, the spiral body is fixedly connected to the fixing rod, and the spiral electrode modules are arranged in an axial direction of the probing rod;

a pitch of the spiral electrode is the same as a height of the module body, that is, each spiral electrode makes a full circle around the annular outer side of the module body, a top end of the spiral electrode is fixedly connected to the module body, an annular side wall of the module body is provided with a sliding groove in the axial direction, an electrode transmission fixture is slidably arranged in the sliding groove, and the electrode transmission fixtures in the sliding grooves are all fixedly connected to a transmission cable, and driven by the transmission cable to slide up and down in the sliding grooves; and electrode transmission fixtures are also arranged at a one-half pitch of the spiral electrode and at a bottom end of the spiral electrode, and are fixedly connected to the spiral electrode, a deformation of the spiral electrode is controlled by a sliding of two electrode transmission fixtures at a middle and bottom of the spiral electrode to form a closed annular electrode, and at this point, the resistivity probing rods enter a measurement mode.

\* \* \* \* \*